United States Patent [19]

Marquess

[11] 4,080,835
[45] Mar. 28, 1978

[54] SUBMINIATURE LINEAR ACCELEROMETER

[75] Inventor: Richard Donovan Marquess, Concord, Calif.

[73] Assignee: Systron-Donner Corporation, Concord, Calif.

[21] Appl. No.: 725,046

[22] Filed: Sep. 20, 1976

[51] Int. Cl.² ............................................. G01P 15/08
[52] U.S. Cl. .................................................. 73/517 B
[58] Field of Search ............. 73/516 R, 517 B, 517 R; 318/651, 676

[56] References Cited

U.S. PATENT DOCUMENTS

| 2,591,921 | 4/1952 | Cosgriff et al. | 73/516 R |
| 3,690,187 | 9/1972 | Morris | 73/517 B |
| 3,702,073 | 11/1972 | Jacobs | 73/517 B |
| 3,707,091 | 12/1972 | Morris et al. | 73/517 B |

FOREIGN PATENT DOCUMENTS

| 1,362,121 | 7/1974 | United Kingdom | 73/517 B |

*Primary Examiner*—James J. Gill
*Attorney, Agent, or Firm*—Flehr, Hohbach, Test, Albritton & Herbert

[57] ABSTRACT

A linear accelerometer is contained within a combination framework and case having a magnetic circuit including an annular gap with a magnetic flux density therethrough. An insulated bearing mount is fixed within the framework carrying a pair of opposed axially adjustable bearings defining a pivot axis. The bearings are supported in a resilient mass. A moving member carries a pair of pivots which seat in the bearings allowing motion of the moving member about the pivot axis. The moving member carries a torque coil disposed in the annular gap. Pick-off coils are mounted on the framework closely spaced from opposing planar conducting surfaces on the moving member. A pair of flexible leads extend between the framework and the moving member, providing electrical power to the torque coil.

3 Claims, 4 Drawing Figures

U.S. Patent  March 28, 1978  4,080,835
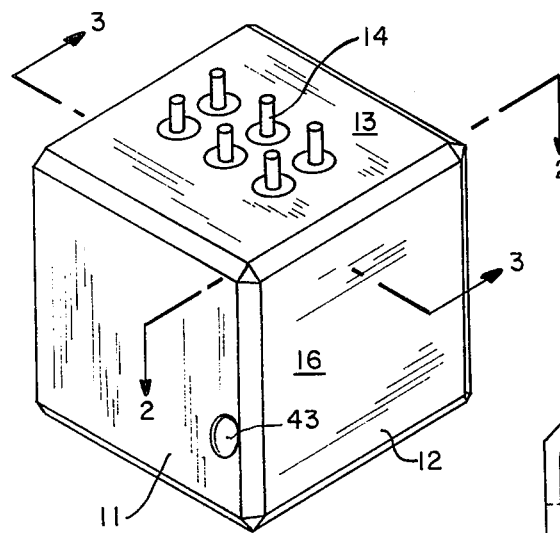
FIG.—1
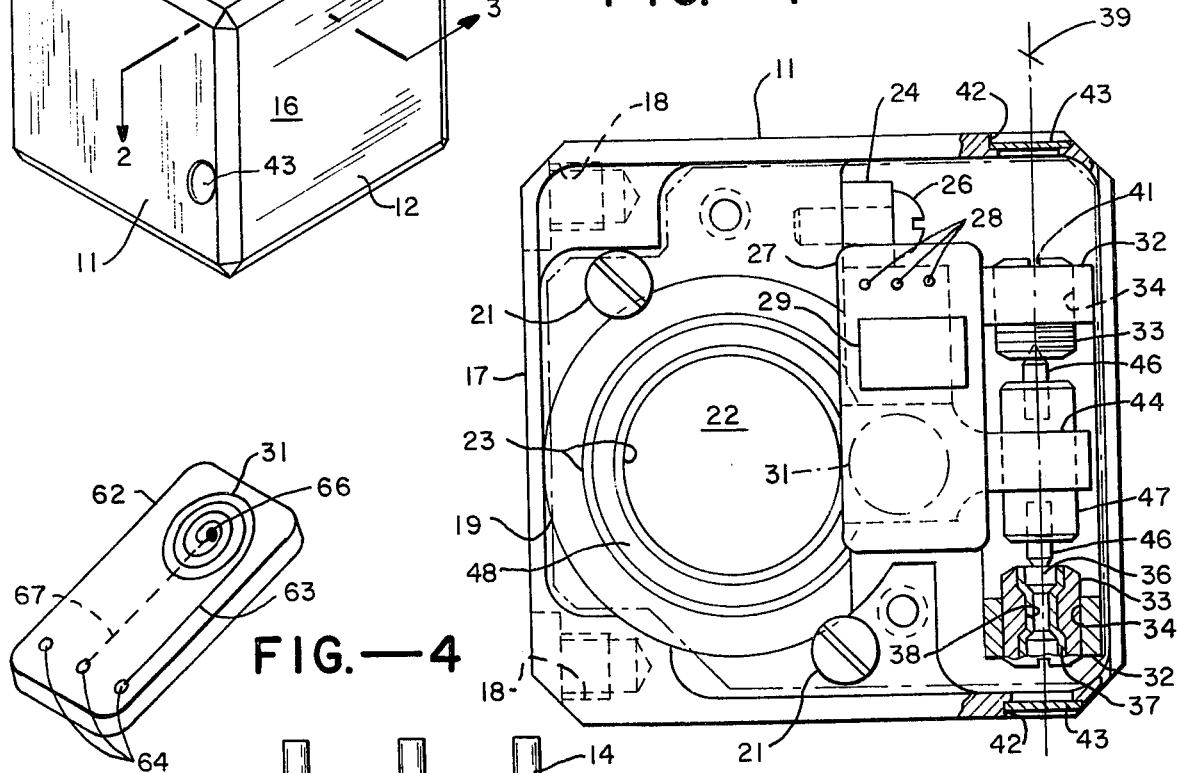
FIG.—2
FIG.—4
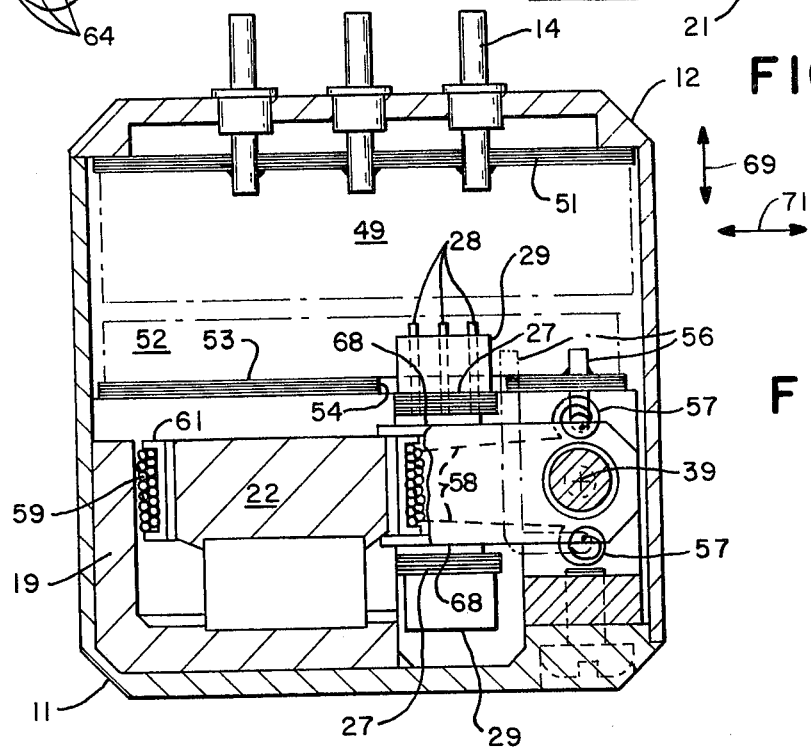
FIG.—3

SUBMINIATURE LINEAR ACCELEROMETER

BACKGROUND OF THE INVENTION

This invention relates to a force balance linear accelerometer, and more particularly to such an accelerometer for use in high performance, small weight and volume applications.

Acceleration sensing devices in the past have incorporated relatively large seismic mass elements and relatively large mass displacement by linear acceleration to provide usable signal to noise ratios. The large mass and displacement requirements are difficult to obtain for applications where severe shock, vibration and temperature environments are present. Force balance acceleration transducers tend to provide acceleration sensors which are capable of functioning in these severe environments, but acceptable signal to noise ratios and environmentally capable support structure are still difficult to obtain in small volume and weight units where high performance acceleration sensing is required. There is therefore a need for a mechanically sturdy, high dynamic range linear accelerometer which is capable of maintaining structural integrity in high shock, vibration and temperature environments.

SUMMARY AND OBJECTS OF THE INVENTION

In general, this accelerometer contains structure taking a form which affords extremely low volume and weight, and provides a force balance acceleration sensing mechanism having a framework containing a magnetic circuit having an annular gap and a predetermined level of magnetic flux density transiting the gap. A pair of bearings are supported in fixed relation inside the framework structure which define a pivot axis relative to the framework. A moving member fabricated of electrically conductive material has attached thereto near one end and on opposite sides thereof a pair of pivots which are disposed in the pair of bearings so that the moving member is free to rotate about the pivot axis. The moving member has parallel planar faces on opposing sides of the other end, and also has an attached torque coil which is disposed in the annular gap. A pair of pancake pick-off coil assemblies are attached to the framework in close spaced relation with the opposing planar faces on the moving member so that displacement of the moving member about the pivot axis causes differential change in inductance in the pick-off coils. Means for conducting electrical energy extends between the framework and the one end of the moving member which operates to provide current to the torque coil. This last named means is configured to minimize torque from static and dynamic forces which is imparted to the moving member thereby.

It is an object of the present invention to provide a subminiature linear accelerometer which provides high accuracy acceleration sensing in extremely small volume.

Another object of the present invention is to provide a subminiature linear accelerometer which is structurally sound in a wide variety of severe environments.

Another object of the present invention is to provide a subminiature linear accelerometer which provides an electrical output with improved signal to noise ratio.

Another object of the present invention is to provide a subminiature linear accelerometer which is compact structurally and simultaneously improved functionally.

Additional objects and features of the invention will appear from the following description in which the preferred embodiment has been set forth in detail in conjunction with the accompanying drawings.

BRIEF DESCRIPTION OF THE DRAWINGS

FIG. 1 is an isometric view of an outline of the disclosed linear accelerometer.

FIG. 2 is a sectional plan view along the line 2—2 of FIG. 1.

FIG. 3 is a sectional elevational view along the line 3—3 of FIG. 1.

FIG. 4 is an isometric view of a pick-off coil assembly utilized in this invention.

DESCRIPTION OF THE PREFERRED EMBODIMENTS

FIG. 1 shows an outline of the disclosed linear force balance accelerometer having the shape of a cube configured to fit within a 1 inch diameter bore. The outer case may take any one of a number of configurations, but is herein described as including a framework section 11 together with a cover section 12. The cover section 12 may be envisioned as including the upper surface 13 of the cube of FIG. 1 containing a plurality of isolated electrical terminals 14, as well as one vertical side 16 of the cube.

FIG. 2 shows the disclosed linear accelerometer with the cover 12 removed. Framework 11 may be seen to provide both a portion of the exterior surface of the instrument as well as a structural framework for mounting the internal portions of the accelerometer. Framework 11 has one side 17 serving as a mounting surface having threaded mounting holes 18 therein for securing the accelerometer to a device for which acceleration is to be monitored. An iron cup 19 serves as a portion of a magnetic circuit and is retained within framework 11 by means of screws 21. A pole piece 22 is included in the magnetic circuit cooperating with iron cup 19 to form an annular gap 23 therebetween.

A spacer 24 is attached to framework 11 by means of a screw 26. First and second pick-off boards 27 are shown attached to opposing sides of spacer 24 by means such as an appropriate adhesive. Pick-off boards 27 have attached thereto a plurality of electrical terminals 28 and an integrated circuit package 29. A flat pick-off coil 31 is shown in dashed lines as being on the opposite side of pick-off board 27 from that viewed in FIG. 2. Flat or planar pick-off coils 31 are electrically connected to terminals 28 as will hereinafter be described.

A "U" shaped bearing support member 32 having parallel extending side arms is attached to the inside of framework 11 and is fabricated of some insulator material. A pair of bearing retainers 33 are shown which are threadably engaged in a pair of threaded holes 34 in the side arms of bearing support member 32. A bearing 36 is resiliently retained within each bearing retainer 33 by means of some resilient material 37, such as RTV ™ silicone rubber, disposed between an inner bore 38 through retainer 33 and bearing 36. Bearing 36 may be of the type disclosed in copending patent application Ser. No. 673,113 for a Stable Preload Shock Mounted Bearing Assembly, filed Apr. 2, 1976. A pivot axis 39 is defined relative to framework 11 by bearings 36. Bearing retainers 33 may be seen to be adjustable along a portion of the length of pivot axis 39 by engaging the rear portion of retainers 33, such as to a screwdriver slot 41, and turning the retainers 33 within the threaded holes of 34. Access to screwdriver slot 41 is provided through holes 42 in framework 11 located along pivot axis 39. Sealing covers 43 are provided for covering holes 42 after appropriate adjustment of retainers 33 has been made. Covers 43 are retained in place by use of an appropriate adhesive such as a suitable epoxy for example.

A moving structural member 44 is fabricated of some electrically conductive material, such as aluminum. A pair of pivots 46 are mounted at one end of moving structural member 44 by means of a pivot mount 47 which is retained in the one end. Pivots 46 engage bearings 36 on pivot axis 39 so that moving structural member 44 may rotate pivotally about pivot axis 39. The other end of moving structural member 44 has attached thereto a torque coil assembly 48 which is seen to be disposed within the annular gap 23.

FIG. 3 shows the linear accelerometer with cover 12 in place so that the interior of the accelerometer is isolated from external atmospheric environments. Isolated electrical terminals 14 are shown extending through surface 13 of cover 12 into a first compartment 49 for containing circuitry including a servo amplifier and power supply with regulation circuitry included. In the compartment 49 a circuit board 51 is provided for mounting the circuitry and for electrically connecting that circuit to electrical terminals 14. An adjacent compartment 52 is provided containing another circuit board 53 for mounting oscillator circuitry operating in conjunction with integrated circuit package 29, and providing a direct drive tuned circuit for pick-off purposes, operating as described in co-pending patent application Ser. No. 728,854, filed on Oct. 1, 1976. Circuit board 53 may be seen to have an aperture 54 therein for allowing terminals 28 and integrated circuit package 29 to pass therethrough into adjacent compartment 52. Additional circuit board 53 also has a pair of terminals 56 mounted therein which lead to positions adjacent to but spaced from moving member 44 on opposite sides of pivot axis 39 as seen in FIG. 3. Flexible leads 57 extend from the ends of terminals 56 and are attached to moving member 44 at points close to but on opposite sides of pivot axis 39. Electrical conductors 58 are extended from the ends of flexible leads 57 to a coil 59 of electrically conducting wire wound around a coil form 61. Coil 59 and coil form 61 comprise torque coil assembly 48.

First and second pick-off boards 27 are configured as shown in FIG. 4. The boards 62 are formed of electrically insulating material and flat pick-off coil 31 is a spiral conducting path etched on board 62 in a conventional fashion. One end of coil 31 is extended by means of an etched lead 63 to one of a plurality of through plated holes 64 in board 62. The other end of coil 31 is connected to an additional through plated hole 66 and extended to another one of the through plated holes 64 on the opposite side of board 62 by means of another etched lead 67. Electrical terminals 28 are fixed in through plated holes 64, thereby providing electrical access to inductance coils 31.

The disclosed linear accelerometer contains the circuitry necessary to receive DC power for excitation, provide a pick-off excitation frequently receive, detect and present the pick-off circuit output as a linear acceleration indicative signal, and to couple the pick-off output to the torque coil for driving the moving member to a neutral position about the pivot axis. The unique structure disclosed herein provides for the capablity of disposing the entire linear accelerometer triaxially within a one inch diameter bore with consequent light weight.

The mechanical function of the linear accelerometer may be explained as follows. Moving member 44 has opposing planar faces 68 thereon which are best viewed in FIG. 3 of the drawings. Since moving member 44 is an electrically conducting member, inductance is varied differentially within flat inductance coils 31 which are spaced in close relationship to surfaces 68 on the faces of pick-off boards 62 in accordance with the above-referenced co-pending patent application. The acceleration sensitive axis of the disclosed linear accelerometer is indicated by arrow 69 in FIG. 3. In theory, there is no acceleration sensitivity along the axis aligned with arrow 71. Flexible leads 57 could impart torque to moving member 44 statically, by virtue of any spring force they may contain, or dynamically, by virtue of any mass they may add to moving member 44 which is offset from pivot axis 39. For acceleration levels in the direction of arrow 71, the disclosed accelerometer reduces cross axis sensitivity by applying substantially equal mass addition to moving member 44 on opposite sides of and at substantially equal distances from pivot axis 39. Static torque induced in moving member 44 by flex leads 57 is reduced by the spiral configuration and by utilizing a flex lead with substantially zero spring constant.

Usual configurations of linear accelerometers of this type require a flat or paddle shaped member which undergoes a differential displacement or excursion within a space between two opposed inductance coils. In this disclosed accelerometer the structural portion of the moving member is utilized as the "paddle" "portion" reducing required volume for the instrument. Moreover, the flat faces 68, due to the high gain and high sensitivity of the pick-offs, may be located closer to pivot axis 39 than the torque coil assembly 48. The use of integrated circuits, flat inductance coils and coil mounts, together with shock and vibration isolation contained within the bearing retainers provides a compact, low weight accelerometer producing a high signal to noise ratio output with functional capability in severe environments matched only by relatively voluminous and expensive instruments now available in the field of acceleration sensing instruments.

What is claimed is:

1. A force balance accelerometer mechanism configured to occupy minimal volume, comprising a framework, first and second bearings, means for mounting said first and second bearings in fixed relationship with said framework defining a pivot axis relative thereto, a moving member, first and second pivots attached to said moving member toward one end thereof and engaging said first and second bearings respectively, whereby said moving member is free to move pivotally relative to said framework about said pivot axis, first and second conducting planar surfaces carried by the other end of said moving member on opposite sides thereof and being oriented so that they are parallel to said pivot axis, a torque coil attached to the other end of said moving member, means mounted in said framework providing a magnetic field interacting with said torque coil to produce a torque on said moving member about said pivot axis, first and second pick-off mounting members of insulating material mounted on said framework, each having a planar face disposed in close spaced relation with said first and second planar surfaces respectively, first and second etched spiral pick-off coils formed on said planar faces of said first and second pick-off mounting members respectively, first and second flexible conducting leads having substantially equal mass extending between said one end of said moving member and said framework, first and second electrical conductors connected between the ends of said first and second flexible conducting leads respectively extending to said one end of said moving member and opposite electrical ends of said torque coil, said first and second conducting leads being attached to said moving member at said one end proximate to, substantially equidistant from, and at substantially 180° separation about said pivot axis.

2. A subminiature force balance accelerometer, comprising a framework, a magnetic circuit having an annular gap with a predetermined magnetic flux density therein, first and second bearings, means for supporting said first and second bearings in fixed relation within said framework defining a pivot axis relative thereto, a moving member fabricated of electrically conductive material, said means for supporting being an electrical insulator, whereby said moving member is isolated electrically from said framework, first and second pivots attached to one end of said moving member disposed in said first and second bearings respectively, whereby said moving member is free to pivot about said pivot axis, first and second parallel planar faces on opposing sides of and toward the other end of said moving member, a torque coil attached to the other end of said moving member disposed in said annular gap, first and second pancake pick-off coil assemblies attached to said framework in close spaced relation with said first and second planar faces respectively, whereby displacement of said moving member about said pivot axis causes differential change in inductance in said first and second pick-off coils, a pair of conducting leads having flexible sections therein extending between said framework and said one end, and further extending in fixed position along said moving member being connected to conduct electrical energy to said torque coil, said flexible sections being fixed to said one end proximate to and separated substantially 180° about said pivot axis, and having minimal substantially equal mass to thereby minimize torque from static and dynamic forces respectively imparted to said moving member thereby.

3. A miniaturized linear accelerometer comprising a framework, a magnetic circuit having a gap therein with a flux density therein, a "U" shaped member having first and second parallel side arms mounted in said framework, said first and second parallel side arms each having a bearing mount opening therein, first and second bearings, means for resiliently mounting each of said first and second bearings in one said bearing mount opening and defining a pivot axis therethrough, said last named means being adjustable in position along said pivot axis, a moving structural member being of electrically conductive material, first and second pivots mounted on said moving structural member contacting said first and second bearings, whereby said moving structural member is free to move rotationally about said pivot axis, one end of said moving structural member being farther from said pivot axis than the other end, first and second planar inductance coils, first and second planar pick-off boards mounted on said framework carrying said first and second planar inductance coils closely spaced in relation with said one end of said moving member on opposite sides thereof, whereby pivotal motion of said moving member produces differential inductive change in said first and second planar inductance coils, a torque coil attached to and supported by said one end and disposed in said gap, first and second flexible conductors having minimal spring constants which extend between said framework and said moving structural member being attached to said other end of said moving structural member at points proximate to said pivot axis and spaced substantially 180° thereabout, and also being connected to opposing electrical ends of said torque coil, whereby static and dynamic torque induced in said moving structural member by spring generated torque and mass unbalance respectively due to said first and second flexible conductors is reduced, said moving structural member being urged rotationally about said pivot axis by electric current passing through said flexible conductors and said torque coil, and means for sealing cooperating with said framework operating to isolate said first and second bearings and said moving structural member from ambient atmosphere.

* * * * *